Nov. 25, 1969   J. W. GIESE   3,480,112
ADJUSTABLE APPLICATOR FOR LUBRICATING BALL BEARINGS
Filed May 29, 1968

INVENTOR.
JACK W. GIESE
BY
ATTORNEYS

United States Patent Office 3,480,112
Patented Nov. 25, 1969

3,480,112
ADJUSTABLE APPLICATOR FOR LUBRICATING
BALL BEARINGS
Jack W. Giese, 3680 Ethan Allen Ave.,
San Diego, Calif. 92117
Filed May 29, 1968, Ser. No. 733,070
Int. Cl. F16n 5/00, 7/14, 11/10
U.S. Cl. 184—1        4 Claims

ABSTRACT OF THE DISCLOSURE

An apparatus for lubricating race mounted roller or ball bearings freely mounted, having cages, or having ball separators and being open or shielded. A plurality of nozzles each having several orifices are selectively radially displaceable by the mechanical cooperation of a guide member and camming member each concentrically carried on a body member. The apparatus is mounted on a lubrication table that discharges a precisely measured amount of lubricant. The lubricant passes through the plurality of tubes to the nozzles and onto the bearing positioned immediately adjacent the nozzles. A single such applicator can be used to lubricate bearings of different diameters since all that is required is to merely twist the camming member to radially displace the nozzles to accommodate the various sized bearings. By being constructed of plastics or Teflon-like substances chemical reaction between the invention and the lubricants used is eliminated.

---

The invention described herein may be manufactured and used by or for the Government of the United States of America for governmental purposes without the payment of any royalties thereon or therefor.

Background of the invention

The present invention pertains to the field of bearing lubrication devices used primarily to lubricate race mounted bearings that, as a requirement for efficient operation, require that a particular type of lubricant be uniformly applied in a precisely measured amount. While the state of the art shows that lubrication tables have been designed applying lubricants to bearings of a particular diameter, there still exists a need for an applicator to uniformly distribute the lubricant over a bearing and to be readily adjustable to accommodate bearings of various sizes without elaborate procedures involving the removal and replacing of different sized applicators. Another limitation of existing lubricators is that the metals used in construction can and do react with certain lubricants to contaminate certain sophisticated bearing assemblies.

Summary of the invention

The present invention is directed to providing an apparatus for lubricating race mounted roller or ball bearings and includes a source of pressurized lubricant coupled to a body member formed with a chamber having a plurality of output ports. A pin or screw securely holds a disc-shaped guide member provided with a plurality of radially extending slots. Between the guide member and the body member, a camming member having several camming surfaces spaced to coincide with the radial extending slots, is pivotally supported on the pins. A nozzle having a plurality of outwardly directed orifices communicating with an oppositely directed inlet port is carried in each of the radially extending slots and is provided with a cam follower portion extending into a separate one of the camming slots. A plurality of flexible tubes, each one extending between a separate outlet port and inlet port, deliver lubricant from each chamber and through the orifices. Providing several orifices in each nozzle ensures a uniform distribution of lubricant on the bearing and by selectively rotating the camming member the nozzles can be radially displaced to coincide with the dimensions of various sized bearings.

It is a prime object of the present invention to provide an improved bearing lubricator.

Another object of the instant invention is to provide a lubricant applicator that is completely adjustable thereby enabling the rapid lubrication of bearings of different diameters.

Another object is to provide a lubricant applicator that uniformly distributes a measured amount of lubricant on a bearing assembly.

A further object is to provide a lubricant applicator constructed of materials that tend to eliminate chemical reaction with the lubricants used.

These and other objects of the present invention will become readily apparent from the drawings and ensuing description.

Description of the preferred embodiment

Figure 1:
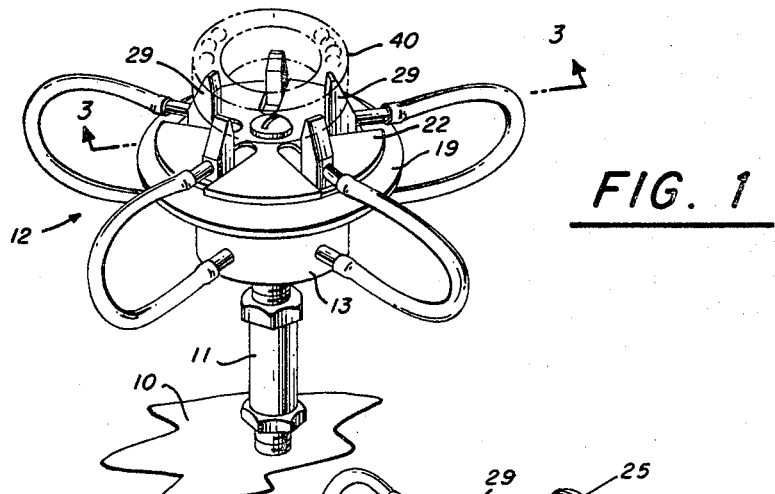
FIG. 1 is a perspective view of the invention showing a bearing assembly in phantom being operatively engaged by invention.
Figure 2:
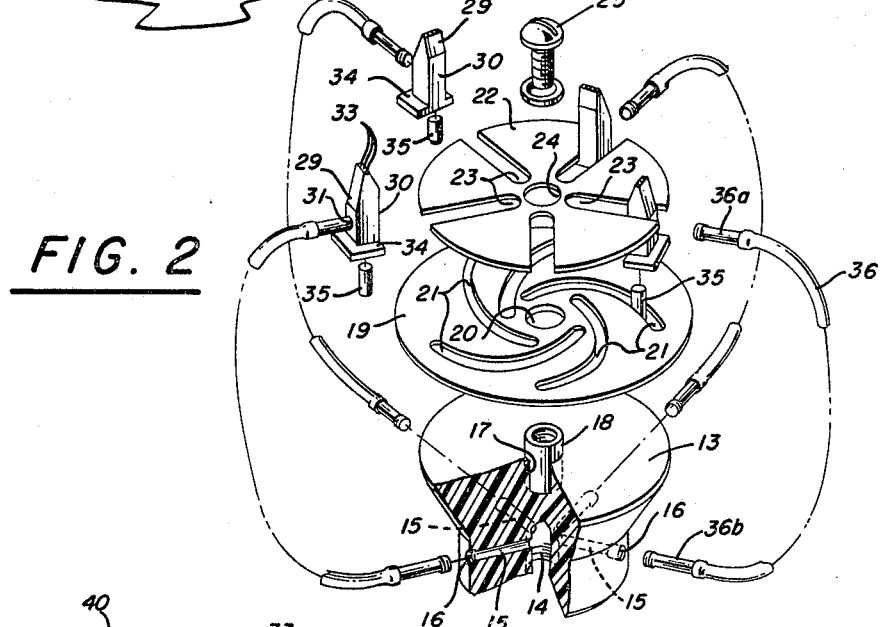
FIG. 2 is an exploded view of the invention.
Figure 3:
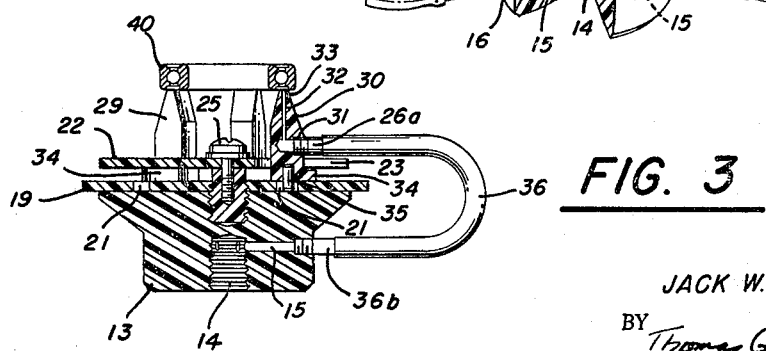
FIG. 3 is a sectional view of the adjustable applicator taken along lines 3—3 in FIG. 1.

Referring now to the drawings, the invention is intended to be used with a standard lubrication table 10 which, through metering and precise valving, dispenses a discrete amount of lubricant. A tubular fitting 11 extends from the table to an adjustable lubricant applicator 12 and positions the applicator in a horizontal relationship. A body member 13 is provided with a cylindrically shaped cavity 14 having its walls threaded to permit connection with the tubular fitting. A plurality of bores 15 extend from the cavity through the body member and each terminates in an outlet port 16. Coaxially disposed with respect to the cavity, a recess 17 secures an internally threaded bushing 18 projecting above the plane defined by the top of the body member.

A camming disc 19 is formed with a cam disc bore 20 sized to freely fit around the projecting portion of the bushing and allows the disc and the body member to abut in a contiguous relationship. A plurality of arcuate cam slots 21 are provided in the cam disc and are so oriented as to impart a desired cammed motion, it being understood that the configuration of the cam slots would be a matter of choice of the designer. Additionally, the outer peripheral rim of the cam disc could be knurled to give an operator a better grip when adjusting the applicator.

With the camming disc seated in place, the projecting portion of the bushing supports a guide disc 22 in a parallel spaced relationship with respect to the camming disc, the reason for which will be pointed out below. The disc is shaped with a plurality of radially extending open ended guide slots 23. A guide disc bore 24 is concentrically located and of such diameter to rest on top of the bushing 18. A bolt 25 threaded into the bushing 18 secures the camming and guide disc onto the body member and the secured bushing serves as an axle for the camming disc.

Each nozzle 29 is used to uniformly distribute the lubricants onto a portion of the bearing surface and includes a body 30 formed with an inlet port 31 directly communicating with plurality of orifice ducts 32 leading to orifices 33. A base projection 34 laterally extends from the nozzle body and is of a thickness less than the distance separating the camming disc and the guide disc. This separation taken with the fact that the width of the nozzle body is slightly less than the width of the guide slots permits free axial traverse of each nozzle within its respective guide slot. A cam follower pin 35 disposed in the base of each nozzle is sized to permit a cam following action when mechanically cooperating with a separate cam slot in the camming disc. By turning the camming disc each separate nozzle is axially displaceable in accordance with the cam on the camming disc. The nozzles are prevented from leaving the guide slots by the follower pin that is inserted in a cam slot.

Several interconnecting means each consisting of a length of flexible tubing 36 having adaptors 36a and 36b at opposite ends, individually connects separate ones of the outlet ports 16 to separate ones of the inlet ports 31 to enable the transfer of lubricant from the cylindrically shaped cavity 14 to the nozzle orifices.

To operate the adjustable applicator a bearing assembly 40 having an inner and outer ring provided with opposed races is placed on top of the adjustable applicator with the ball bearings opposite the orifices on the several nozzles. The lubrication table is actuated to dispense the desired amount of lubricant onto the bearing. Pressure forces these lubricants from the cylindrical cavity, through the flexible tubings, and through the nozzles and onto the bearing. When a sufficient amount of this lubricant has been secreted, the operator merely has to turn the bushing a portion of a turn and repeat the process to get a uniform distribution of lubricant onto the bearing assembly. If the next bearing assembly is of a different diameter, the operator merely has to rotate the camming disc to realign the nozzles with the assembly and the process is repeated. Such ease of operation, especially where a substantial number of various sized bearings are encountered, results in a considerable time saving and eliminates a large inventory of discretely sized lubrication applicators.

Construction of the adjustable applicator of Teflon plastics, or similar non-corrosive or non-active materials, eliminates the possibility of contamination of the lubricants passing through the apparatus and the bearings being lubricated. Teflon construction additionally ensures a friction free apparatus.

The disclosure above sets forth only an applicator having a single supporting bolt. It is readily understood that several bolts could be used to hold the guide disc in place and matching grooves could be provided in the camming disc to enable performance of the same function.

Numerous other modifications and alterations of the structure which has been disclosed herein for purposes of illustration, will be apparent to one skilled in the art and it is obvious that the same may be made without departing from the spirit and scope of the invention.

What is claimed is:
1. An apparatus for lubricating bearings comprising:
a source of pressurized lubricant;
a body member;
a guide member having a plurality of traversing slots;
a camming member disposed adjacent said guide member and shaped with a plurality of cam slots;
means for mounting said guide member in a fixed relationship and said camming member in a movable relationship with respect to said body member;
a nozzle member carried in each of said traversing slots and sized to permit traverse displacement therein, each said nozzle member formed with a follower portion disposed in a separate one of said cam slots and a plurality of orifices; and
means interconnecting said source to each said nozzle for permitting the transfer of lubricant through said orifices onto bearings of different diameters when selectively displaced by said camming member.

2. An apparatus according to claim 1 in which said body member includes a chamber configured to communicate with said source that is formed with a plurality of outlet ports, each said nozzle is provided with an inlet port interconnected to said orifices, and the interconnecting means is a plurality of flexible tubes each joining a separate one of said outlet ports to a separate said inlet port.

3. An apparatus according to claim 2 in which both said guide member and said camming member are disk shaped and the mounting means is a pin axially aligning said guide member and said camming member.

4. An apparatus according to claim 3 in which each of said traverse slots radially extends from said pin and the mutual separation is equiangular and the pitch line of each said cam slot displaces its associated follower portion along the line of axis defined by said pin.

References Cited

UNITED STATES PATENTS

| | | | |
|---|---|---|---|
| 2,209,495 | 7/1940 | Scholfield | 184—1 XR |
| 2,839,160 | 6/1958 | Wright | 184—1 |
| 2,866,520 | 12/1958 | Sharp | 184—1 |
| 2,911,068 | 11/1959 | Wright | 184—1 |
| 3,365,024 | 1/1968 | Freda | 184—1 |

FOREIGN PATENTS 495,468  2/1937  Great Britain.

FRED C. MATTERN, JR., Primary Examiner

M. ANTONAKAS, Assistant Examiner